(12) United States Patent
Blazer et al.

(10) Patent No.: US 11,249,273 B2
(45) Date of Patent: Feb. 15, 2022

(54) FIBER CARRYING STRUCTURE HAVING LASER-INDUCED INDICIA AND RELATED METHOD

(71) Applicant: Corning Research & Development Corporation, Corning, NY (US)

(72) Inventors: Bradley Jerome Blazer, Granite Falls, NC (US); David Wesley Chiasson, Edmonton (CA); Kenzie Lee Hathaway, Mooresville, NC (US); Korey Shad Hite, Wilmington, NC (US); Darrin Kenneth Lail, Hildebran, NC (US); David Henry Smith, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 16/903,677

(22) Filed: Jun. 17, 2020

(65) Prior Publication Data

US 2021/0003802 A1 Jan. 7, 2021

Related U.S. Application Data

(60) Provisional application No. 62/869,924, filed on Jul. 2, 2019.

(51) Int. Cl.
*G02B 6/44* (2006.01)
(52) U.S. Cl.
CPC .......... *G02B 6/4482* (2013.01); *G02B 6/443* (2013.01)

(58) Field of Classification Search
CPC .............................. G02B 6/4482; G02B 6/443
See application file for complete search history.

(56) References Cited

U.S. PATENT DOCUMENTS

| 5,111,523 A | 5/1992 | Ferlier et al. |
| 6,370,304 B1 | 4/2002 | Mills et al. |
| 9,513,449 B2 | 12/2016 | Blazer et al. |
| 10,290,398 B2* | 5/2019 | Prange ..................... B41M 5/24 |
| 2017/0243675 A1 | 8/2017 | Prange et al. |
| 2018/0039035 A1 | 2/2018 | Chiasson et al. |
| 2019/0025534 A1 | 1/2019 | Carberry et al. |

FOREIGN PATENT DOCUMENTS

| CN | 201828693 U | 5/2011 |
| EP | 3497498 A1 | 6/2019 |

OTHER PUBLICATIONS

Extended European Search Report and Search Opinion; 20183759. 8; dated Oct. 22, 2020; 9 Pages; European Patent Office.

* cited by examiner

*Primary Examiner* — John Bedtelyon
(74) *Attorney, Agent, or Firm* — William D. Doyle

(57) ABSTRACT

An optical fiber carrying structure that includes a jacket is provided. The jacket includes a primary body portion formed from a first polymer material and a one or more marking region formed from a second polymer material. Indicia are formed in at least one of the marking regions. The indicia are formed from a laser-induced change to the second polymer material.

22 Claims, 13 Drawing Sheets

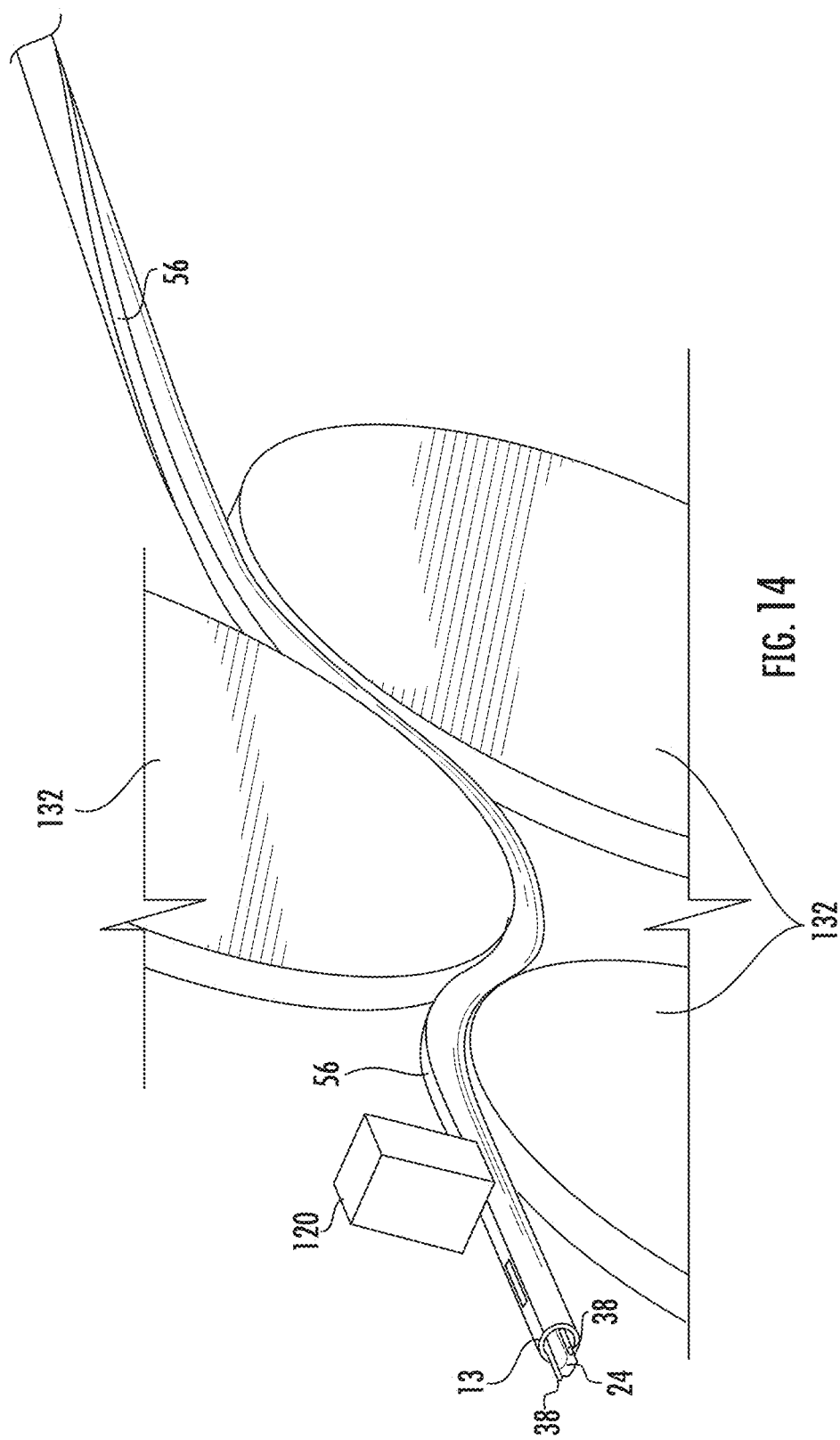

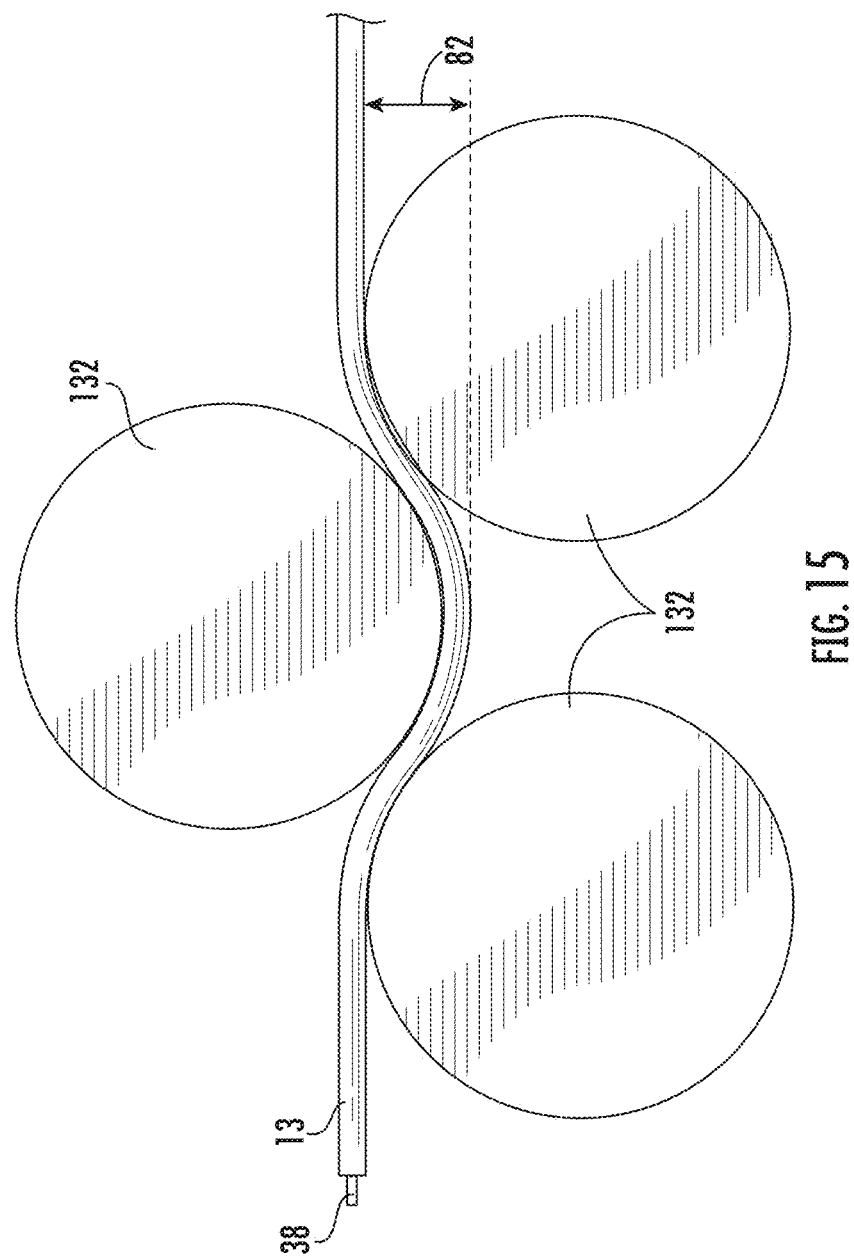

FIBER CARRYING STRUCTURE HAVING LASER-INDUCED INDICIA AND RELATED METHOD

CROSS-REFERENCED TO RELATED APPLICATIONS

This application claims the benefit of priority under 35 U.S.C. § 119 of U.S. Provisional Application Ser. No. 62/869,924 filed on Jul. 2, 2019, the content of which is relied upon and incorporated herein by reference in its entirety.

BACKGROUND

The present invention is related to optical fiber carrying structures and more particularly to optical fiber carrying structures that have a jacket with a composition that facilitates laser printing on the jacket. Optical fiber cables are used to transmit data over distance. Generally, large distribution cables that carry a multitude of optical fibers from a hub are sub-divided at network nodes, which are further sub-divided, e.g., to the premises of individual subscribers. As the optical fibers are subdivided, the cables making up these subdivisions need to be identified by the technicians so that the cables can be appropriately routed.

SUMMARY

In one aspect, embodiments of the disclosure relate to an optical fiber carrying structure including an optical communication element and a jacket with indicia. The jacket includes an inner surface defining a central bore extending longitudinally between opposing ends of the cable jacket. The jacket also includes a primary body portion, a first marking region, and a second marking region. The primary body portion is formed from a first polymer material and the first and second marking regions are formed from a second polymer material that is different than the first polymer material. The first marking region is coupled to the primary body portion and longitudinally extends along the primary body portion. The second marking region is coupled to the primary body portion and longitudinally extends along the primary body portion spaced from the first marking region. The indicia are formed in at least one of the first marking region and the second marking region, and are formed from a laser-induced change to the second polymer material. The optical communication element is located within the central bore and longitudinally extends between ends of the jacket.

In another aspect, embodiments of the disclosure relate to an optical fiber carrying structure including an optical communication element and a jacket with indicia. The jacket includes a first inner surface that defines an internal region that longitudinally extends between ends of the jacket. The jacket also includes an inner polymer layer and an outer polymer layer coupled to the inner polymer layer. Indicia is formed from regions where the outer layer is separated from the inner layer.

In yet another aspect, embodiments of the disclosure relate to a method of manufacturing an optical fiber carrying structure. The method includes moving an optical fiber carrying structure to a laser print head. The optical fiber carrying structure includes an optical communication element and a jacket that radially surrounds the optical communication element. The jacket includes a marking region. The jacket is moved past the laser print head and a position in the marking region is identified. Based on the identification, the laser print head is optionally adjusted relative to the jacket to align the print head with the marking region. A laser is emitted into the marking region to form indicia.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 14 depicts a partial schematic view of a processing line for manufacturing the optical fiber cable of FIG. 4 with laser-induced indicia, according to an exemplary embodiment;

FIG. 15 depicts a partial schematic view of a processing line for manufacturing the optical fiber cable of FIG. 4 with laser-induced indicia, according to an exemplary embodiment;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

Referring generally to the figures, various embodiments of an optical fiber carrying structure are disclosed in which a cable layer, such as a cable jacket or ribbon matrix, includes indicia formed via laser marking. In an optical fiber carrying structure (e.g., cable, bundle, ribbon, buffer tube, micromodule, etc.), the layer being labeled with a series of characters facilitates installation and maintenance of the optical carrying structure.

In one embodiment the layer includes a primary body portion and a marking portion. When a laser is projected on the marking portion then indicia are produced. In some embodiments, indicia are formed by visual contrast resulting from the marking portion being foamed via interaction with the laser energy (e.g., air pockets being created). The foaming produces a lighter appearance than the generally dark outer layer providing the visual contrast.

In other embodiments, indicia are formed by the visual contrast resulting from delamination at the interface between the layers within the cable layer. When the laser is emitted towards the interface then cohesion between the layers is reduced, which produces a separation between the layers. Applicant has found that this separation creates a level of contrast difference (e.g., by changing the light reflecting properties) between the marked area and the surrounding area sufficient to allow the formation of indicia.

Applicant has found that the laser marked cable structures and methods discussed herein provide a variety of improvements over prior cable marking technologies. As compared to cable manufacturing processes utilizing hot foil print techniques to form cable indicia, laser printing is more efficient and allows for easy edits/changes to the print strings. As compared to cable manufacturing processes utilizing ink jet print techniques to form cable indicia, the laser induced indicia are resistant to damage, scuffing, etc. because they are formed from changes to the cable material, rather than through addition of an ink layer. Finally, in specific embodiments, Applicant has determined that a cable structure with two or more marking regions spaced from each other provides manufacturing advantages by decreasing the distance that a laser print head must be rotated in order to align the print head with the marking region.

Figure 1:
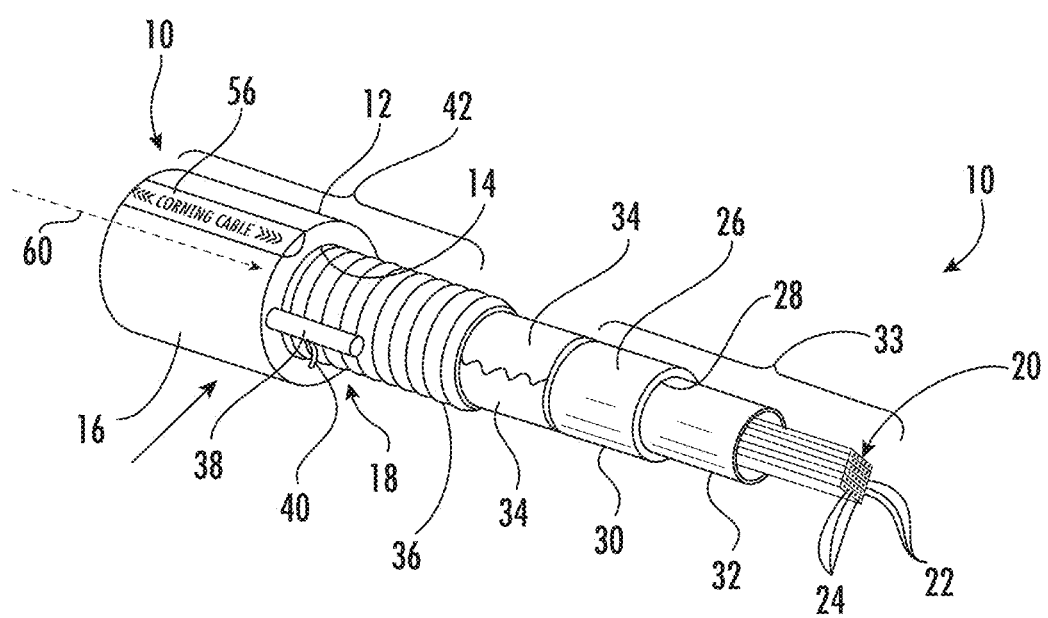
FIG. 1 depicts an optical fiber cable, according to an exemplary embodiment.

FIG. 1 depicts an embodiment of an optical fiber carrying structure, shown as optical fiber cable 10. The optical fiber cable 10 includes a jacket, shown as outer cable jacket 12 having an inner surface 14 and an outer surface 16. The outer surface 16 defines an outermost surface of the optical fiber cable 10. The inner surface 14 of the cable jacket 12 defines a longitudinal bore 18. Disposed within the bore 18 are optical communication elements. In the embodiment depicted, the optical communication elements include a stack 20 of optical fiber ribbons 22. Each optical fiber ribbon 22 includes a plurality of optical fibers 24 arranged in a planar configuration and bound together, e.g., with a matrix material. In embodiments, the stack 20 includes various numbers of ribbons 22, e.g., from one to thirty-two optical fiber ribbons 22. In embodiments, each optical fiber ribbon 22 includes from four to thirty-six optical fibers 24. Thus, in embodiments, the optical fiber cable 10 may include varying numbers of optical fibers 24 in bore 18, e.g., anywhere from four to 3456 optical fibers 24 in the bore 18. In other embodiments, the optical fibers 24 may be in a loose-tube configuration or arranged in a plurality of buffer tubes, e.g., wound around a central strength member.

In the embodiment depicted in FIG. 1, the stack 20 of optical fiber ribbons 22 are contained in a buffer tube 26. The buffer tube 26 has an interior surface 28 and an exterior surface 30. In embodiments, disposed on the interior surface 28 and/or wrapped around the stack 20 is a water barrier layer 32 that prevents or limits water from contacting the optical fiber ribbons 22. In embodiments, the water barrier layer 32 is a water-blocking tape, e.g., that absorbs water and/or swells when contacted with water. In other embodiments, the water barrier layer 32 is an SAP powder applied to the exterior of the stack 20 and/or the inner surface 28 of the buffer tube 26. As used herein, all of the components from the buffer tube 26 inward are referred to as the "cable core" 33.

As shown in FIG. 1, a layer or strips of water-blocking adhesive 34 are applied along at least a portion of the optical fiber cable 10. In the embodiment depicted in FIG. 1, the water-blocking adhesive 34 adheres an armor layer 36 to the buffer tube 26. In embodiments, the armor layer 36 is corrugated. In embodiments, the water-blocking adhesive 34 is foamed, which enhances the volume-filling effect of the water-blocking adhesive 34. The optical fiber cable 10 may include other components, such as longitudinal strength members 38 and/or preferential access features 40, such as a ripcord. The components of the optical fiber cable 10 outside of the water-blocking adhesive 34 (e.g., the cable jacket 12, the armor layer 36, and the strength members 38 in the embodiment of FIG. 1) are referred to as the "jacket structure" 42. The components of the jacket structure 42 are closely coupled (i.e., the cable jacket 12 is extruded around the armor layer 36 and the strength members 38 are embedded in the cable jacket 12), which means that these components contract during thermal cycling effectively the same amount.

Figure 2:
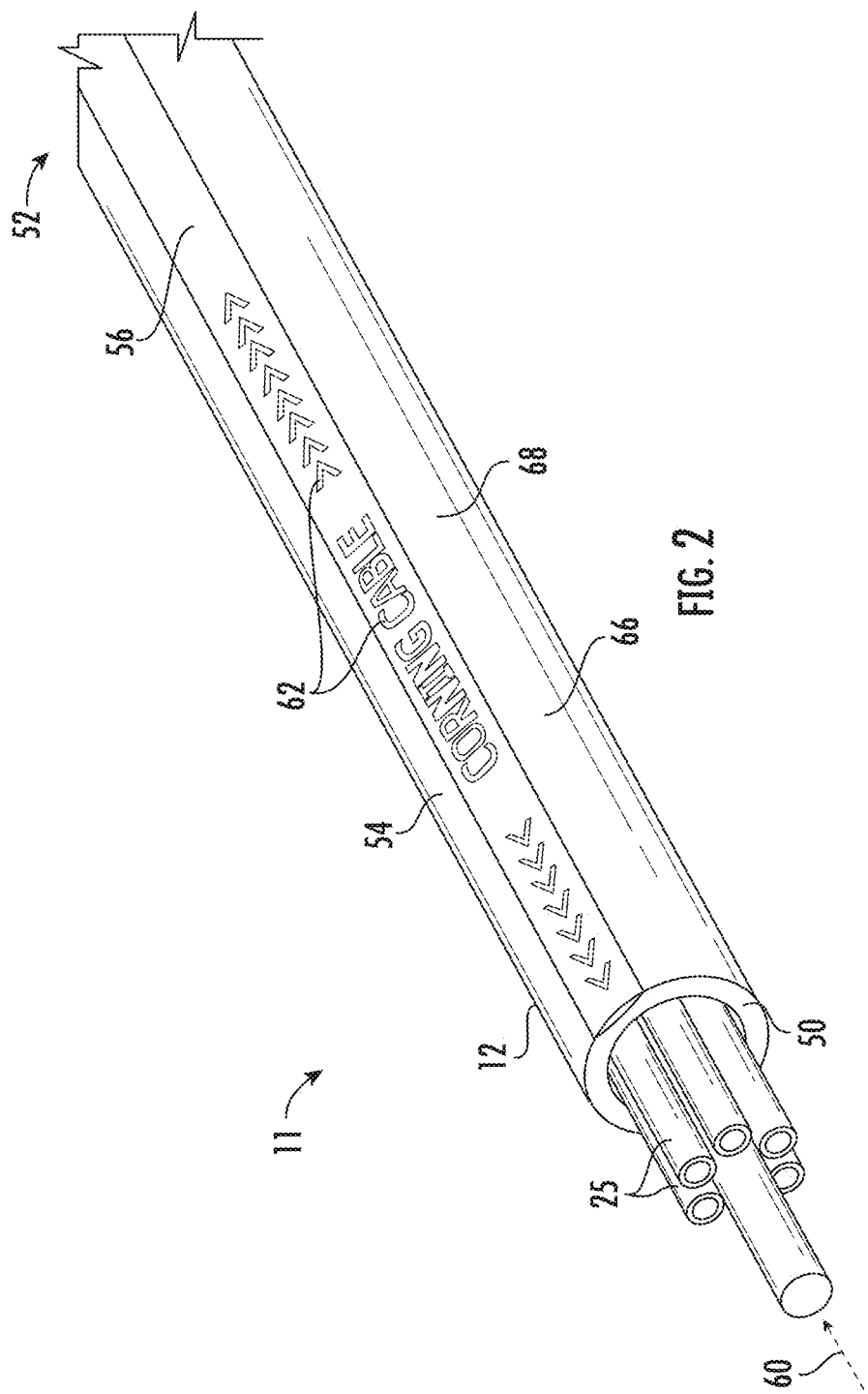
FIG. 2 depicts an optical fiber cable, according to an exemplary embodiment.
Figure 3:
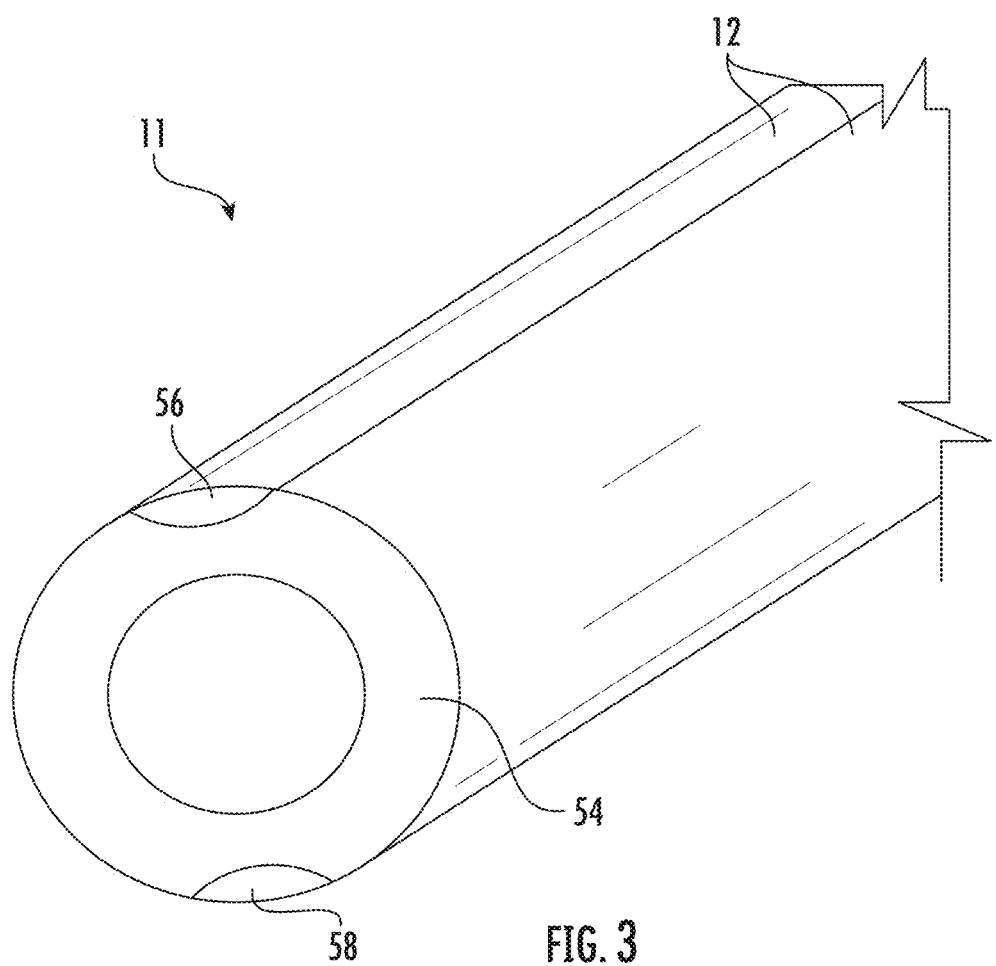
FIG. 3 depicts a perspective view with a cross-section of the optical fiber cable of FIG. 2, according to an exemplary embodiment.

FIGS. 2-3 show an optical fiber cable 11 according to an exemplary embodiment. Optical fiber cable 11 is substantially the same as optical fiber cable 10 except for the differences discussed herein. Further, details of cable jacket 12 and laser marked indicia 62 provided herein are discussed in relation to FIGS. 2-3, with the understanding that cable jacket 12 can be used with a wide variety of optical fiber cables, such as optical fiber cable 10 and optical fiber cable 11. As shown in FIG. 2 optical fiber cable 11 includes a jacket or layer, shown as cable jacket 12. Buffer tubes 25 extend along optical fiber cable 11 in longitudinal direction 60 between first end 50 and second end 52 (e.g., such as SZ stranding buffer tubes 25 along optical fiber cable 11). For ease of depiction individual optical fibers are not shown within buffer tube 25. Although as will generally be understood, each buffer tube 25 will typically contain one or more optical fibers 24.

As shown, optical fiber cable 11 includes a first marking region 56 and a second marking region 58. First marking region 56 and second marking region 58 are coupled to primary body portion 54 and extend along primary body portion 54 in longitudinal direction 60. First marking region 56 and/or second marking region 58 include indicia 62 that are used to identify cable jacket 12 and to facilitate writing additional indicia 62 on first marking region 56 and/or second marking region 58. In the embodiment shown, cable jacket 12 is the outer jacket 66 of optical fiber cable 11 and consequently defines outer-most surface 68 of optical fiber cable 11, although it is contemplated herein that optical fiber cable 11 may be located inside another cable, such as optical fiber cable 10. In particular, in various embodiments, the marking regions and indicia discussed herein may be located on other jacket layers within an optical cable constructions, such as on internal cable jackets, micromodule jackets, buffer tubes, sleeves, bundle jackets, etc.

In one embodiment indicia 62 is initially formed on only one of first marking region 56 and second marking region 58. If it is identified that the initially formed indicia 62 should be corrected, corrected indicia 62 is printed on the other of first marking region 56 and second marking region 58.

In one embodiment primary body portion 54 is formed from a first polymer material, while first marking region 56 and second marking region 58 are formed from a second polymer material that is different than the first material. In a specific embodiment, the first polymer material includes at least 2.5% carbon black by weight, and second polymer material includes less than 2.5% carbon black by weight (e.g., less than 1% carbon black by weight, or more specifically less than 0.5% carbon black by weight, or even more specifically 0.25% or less carbon black by weight). Applicant has found that by reducing the carbon black percentage to less than 2.5% within marking regions 56 and/or 58, high levels of polymer foaming can be created via laser marking which in turn provide high enough contrast to form visible indicia within marking regions 56 and/or 58.

In various embodiments, cable jacket 12 is formed from a polymer material and in specific embodiments is formed from a polyolefin material. Exemplary polyolefins suitable for use in the cable jacket 12 include one or more of medium-density polyethylene (MDPE), high-density polyethylene (HDPE), low-density polyethylene (LDPE), linear low-density polyethylene (LLDPE), and/or polypropylene (PP), amongst others. Exemplary thermoplastic elastomers suitable for use in the cable jacket 12 include one or more of ethylene-propylene rubber (EPR), ethylene-propylene-diene rubber (EPDM), ethylene-octene (EO), ethylene-hexene (EH), ethylene-butene (EB), ethylene-vinyl acetate (EVA), and/or styrene-ethylene-butadiene-styrene (SEBS), amongst others.

As shown in FIG. 3, first marking region 56 and second marking region 58 are spaced apart along cable jacket 12. In the embodiment, shown in FIG. 3 first marking region 56 is spaced circumferentially from second marking region 58 along the outer surface 16 of cable jacket 12. Applicant has found that this spacing reduces the distance that a laser print head needs to be moved to be aligned with at least one of the marking regions. For example, in the embodiment shown, marking regions are arranged symmetrically around cable jacket 12, thus providing that the laser print head will not need to be moved more than 180 degrees with respect to cable jacket 12 to be aligned with one of the marking regions regardless of the orientation of cable jacket 12 as it enters the printer having the print head.

In another embodiment, primary body portion 54 and first marking region 56 and second marking region 58 are formed from the same polymer material with the exception that an additive is added to first marking region 56 and second marking region 58. Thus in this embodiment, the first material of primary body portion 54 is the polymer material without the additive, and the second material of marking regions 56 and 58 are the polymer material with the additive. In various embodiments, the additive affects how first marking region 56 and second marking region 58 react when a laser is emitted into them, which allows for the formation of indicia 62 when exposed to the marking laser by providing high enough contrast to form visible indicia 62 within marking regions 56 and/or 58. The additive may be one or more of mica, metal oxide-coated mica particles, aluminum powder, carbon black, titanium dioxide or calcium carbonate.

In some embodiments, indicia 62 are formed from a laser-induced change to the second polymer material. In one example, the laser-induced change is a physical change to the structure of the second polymer material, such as foaming of the second polymer material. As a result of the foaming, the relatively lighter appearance of the gaseous bubbles, as compared to the darker cable jacket 12, provide a visual contrast that allows indicia 62 to be recognized and read by users of optical fiber cable 11.

Laser-induced indicia 62 may be formed by one or more of several methods of the laser interacting with the cable jacket 12. In one embodiment, the laser causes foaming in the base material. The foaming may be at the surface of the base material and/or below the surface. In another embodiment, the marking laser causes condensation in the material being marked (e.g., the cable jacket), in which the thermal effect of the laser induces a change in the molecular density. In another embodiment, the marking laser causes carbonization within the material being marked causing the marked portions to turn black, which provide visual contrast against lighter cable jackets, such as white cable jackets. In another embodiment, the marking laser causes chemical change or a change in crystal structure within the material being marked, which in turn causes increased contrast for the indicia.

Figure 4:
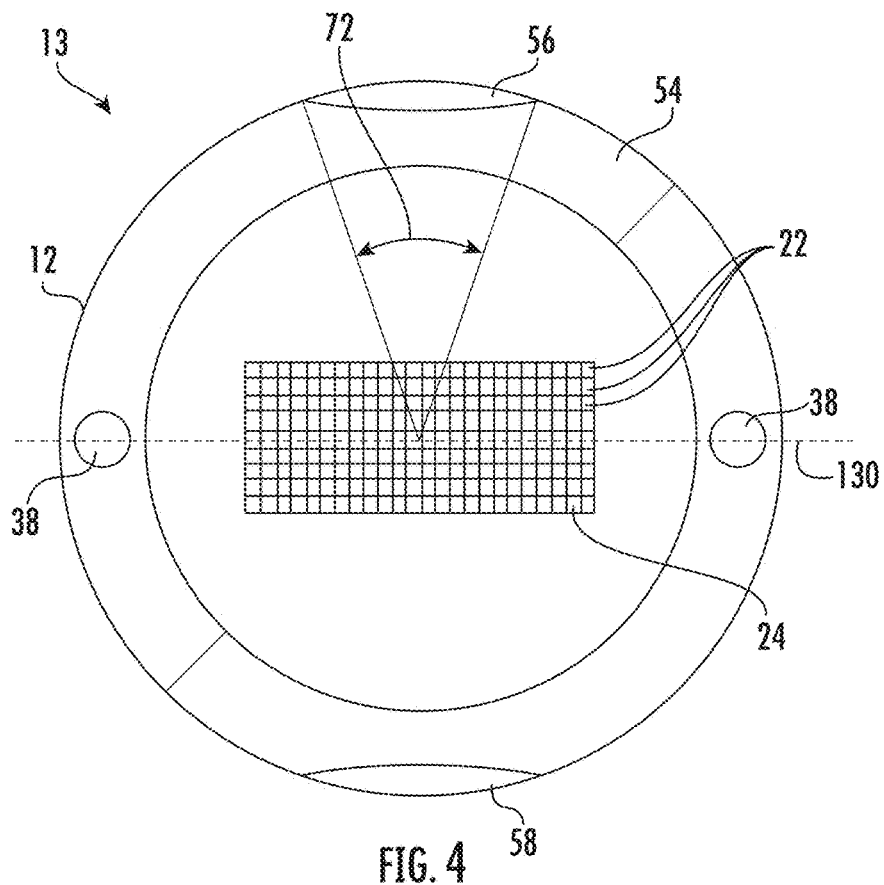
FIG. 4 depicts a cross-section of an optical fiber cable, according to an exemplary embodiment.

FIG. 4 depicts a preferential-bend cable 13, e.g. "cable 13". Cable 13 is substantially the same as optical fiber cable 11 except for the differences discussed herein. Preferential-bend cable 13 includes strength members 38, which extend longitudinally along cable 13. As a result of the positioning of strength members 38, cable 13 bends along axis 130. As shown in FIG. 4, preferential-bend cable 13 preferentially bends up or down and around axis 130 from the perspective of FIG. 4. Similar to optical fiber cable 10, preferential-bend cable 13 includes a plurality of ribbons 22 each supporting optical fibers 24. However, rather than being within a buffer tube, ribbons 22 of preferential-bend cable 13 are immediately surrounded by cable jacket 12. In one or more other embodiments, ribbons 22 are immediately surrounded by a tube or by a foam, which itself is surrounded by cable jacket 12.

In the embodiment shown in FIG. 4, the center of first marking region 56 is located 90 degrees circumferentially away from strength members 38. In various embodiments, regions 56 and/or 58 define an arc length 150 degrees or less, or more specifically 120 degrees or less, or even more specifically less than 90 degrees. In various embodiments, regions 56 and/or 58 define an arc length of 30-120 degrees, and more specifically of 30-60 degrees. In various embodiments, marking regions 56 and/or 58 extend longitudinally along cable jacket 12 in substantially a straight line such that the circumferential positioning of regions 56 and 58 is constant along the length of cable jacket 12. This constant circumferential positioning of first marking regions 56 and/or 58 with respect to cable jacket 12 and strength members 38 facilitates using the preferential bend access to cable 13 to locate first marking region 56 without having to visually search for it during laser marking (described below in FIGS. 12-15).

Figure 5:
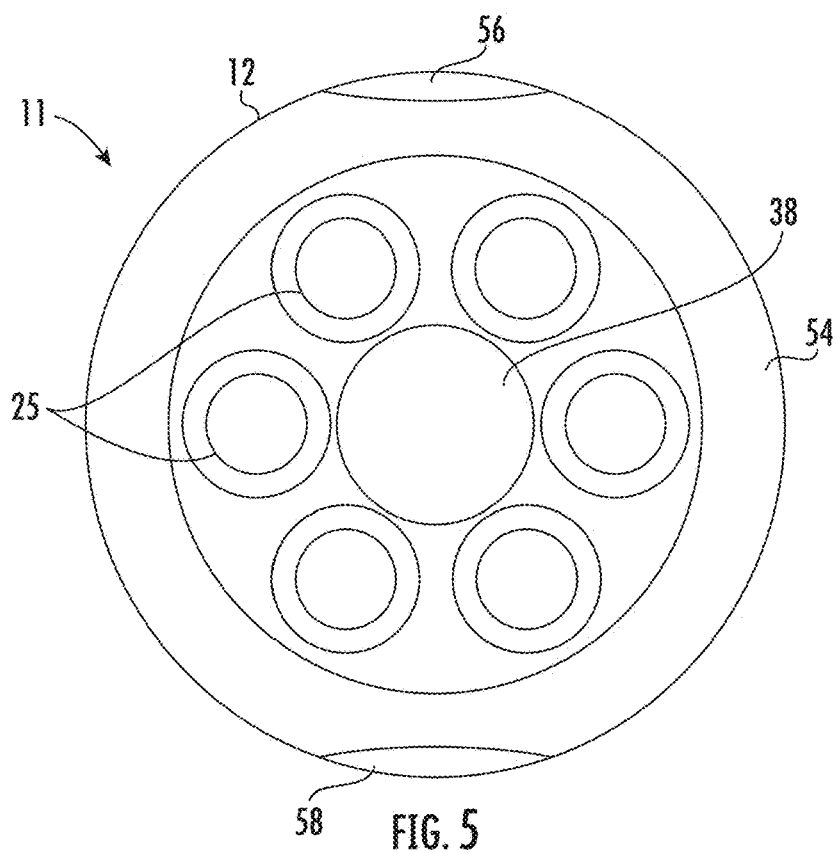
FIG. 5 depicts a cross-section of the optical fiber cable of FIG. 2, according to an exemplary embodiment.
Figure 6:
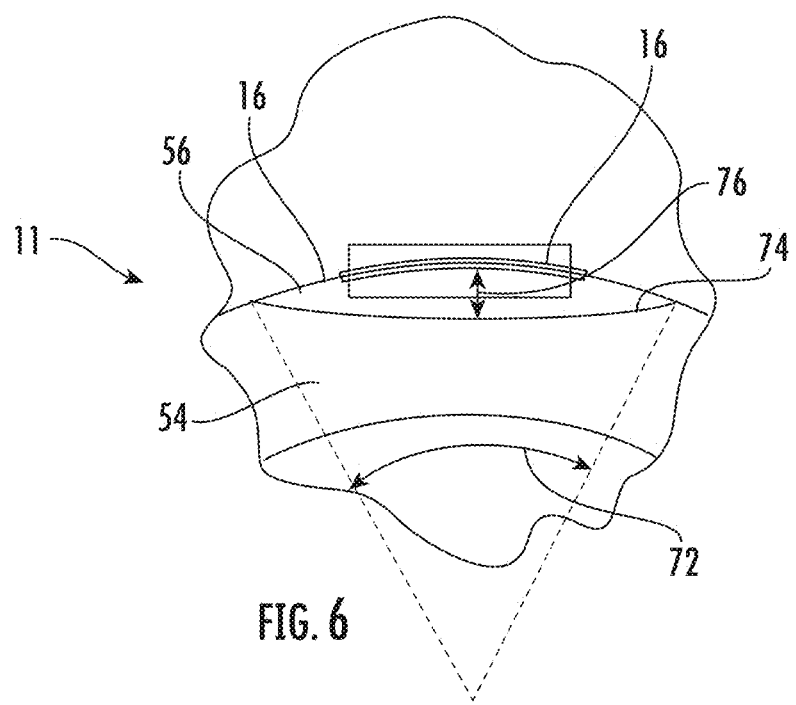
FIG. 6 depicts a detailed view of the optical fiber cable of FIG. 2, according to an exemplary embodiment.
Figure 7:
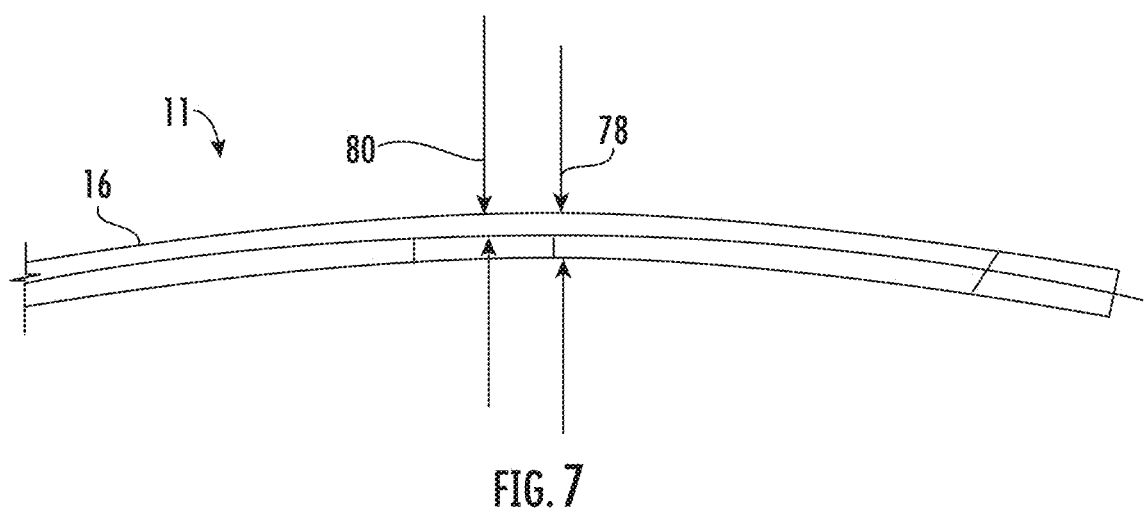
FIG. 7 depicts a detailed view of the optical fiber cable of FIG. 2, according to an exemplary embodiment.

FIGS. 5-7 depict a detailed view of first marking region 56. In one embodiment first marking region 56 has a maximum depth 76 between 0.02 and 0.5 mm, between 10-200 microns, and more particularly has a depth of 150 microns between outer surface 16 and interface 74. First marking region 56 has a circumferential arc length 72 between 30-120 degrees from a center of primary body portion 54, and more particularly has a circumferential arc length of 75 degrees. Contrast depth 78, which is the location of the foaming in first marking region 56, has a depth of 5-200 microns and more particularly has a depth of 110 microns. As a result of foaming, outer surface 16 of cable jacket 12 above the foaming at indicia 62 is radially displaced a distance 80 of 1-50 microns above outer surface 16 of cable jacket 12 that is not above indicia 62, and more particularly is 30 microns.

In one embodiment first marking region 56 and second marking region 58 have a sufficient width (e.g., 3-10 mm) to allow for indicia 62 to be crossed-out with a subsequent laser and new indicia 62 to be formed near indicia 62.

Figure 8:
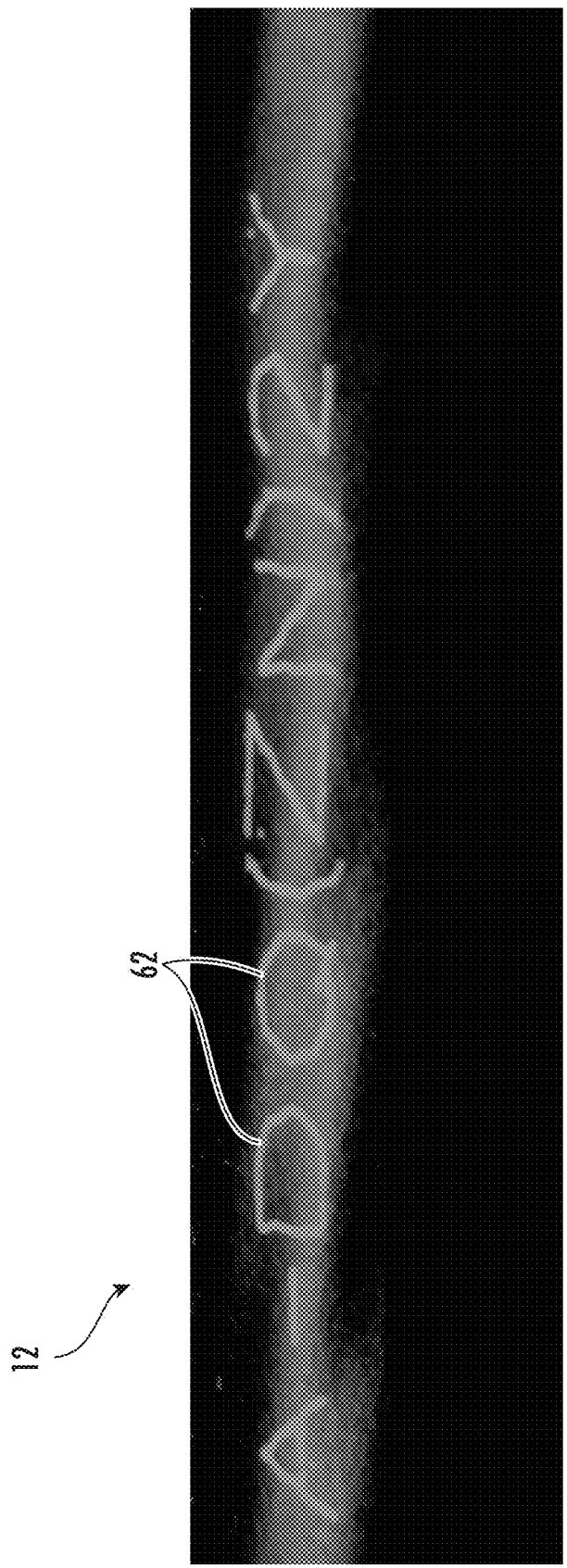
FIG. 8 is an image of an optical fiber cable with laser-induced indicia, according to an exemplary embodiment.
Figure 9:
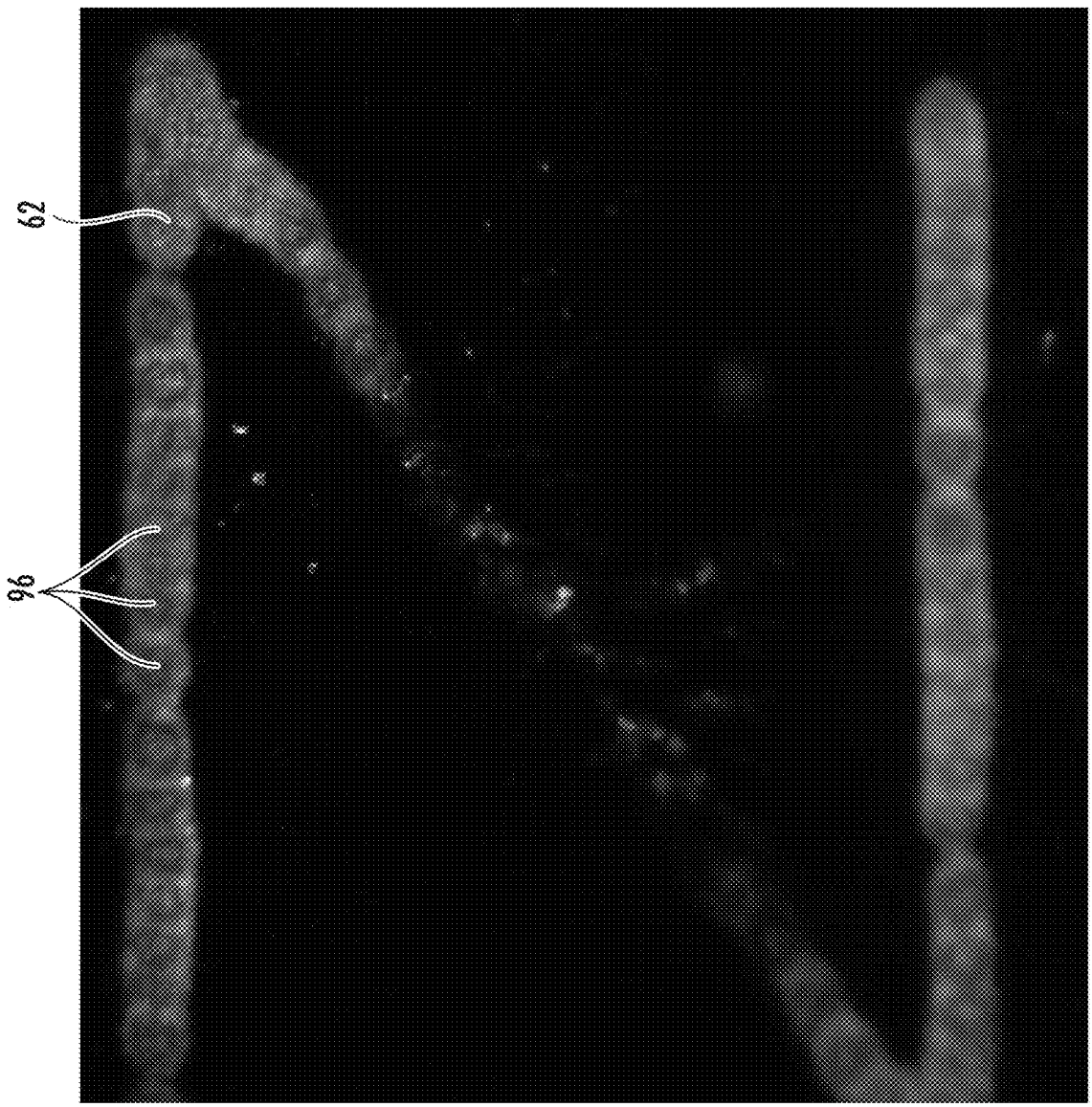
FIG. 9 is a detailed image of an optical fiber cable with laser-induced indicia, according to an exemplary embodiment.

FIGS. 8-9 are photographs of test samples in which indicia 62 have been formed via laser marking within cable jacket 12 via foaming caused by laser marking. As discussed in further detail with respect to FIG. 10 below, delamination regions 96 are formed via laser in a pattern to form indicia 62.

Figure 10:
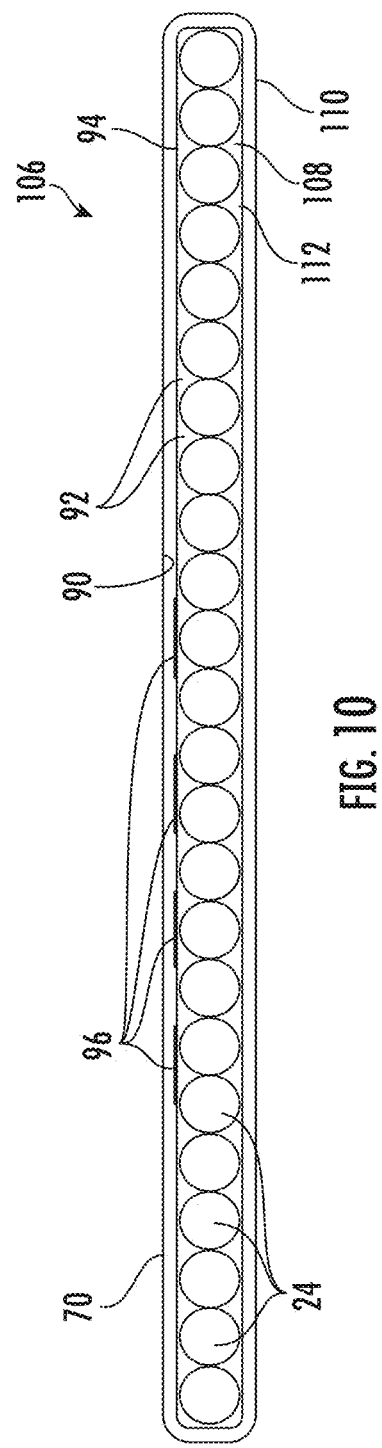
FIG. 10 depicts a cross-section of an optical fiber ribbon, according to an exemplary embodiment.
Figure 11:
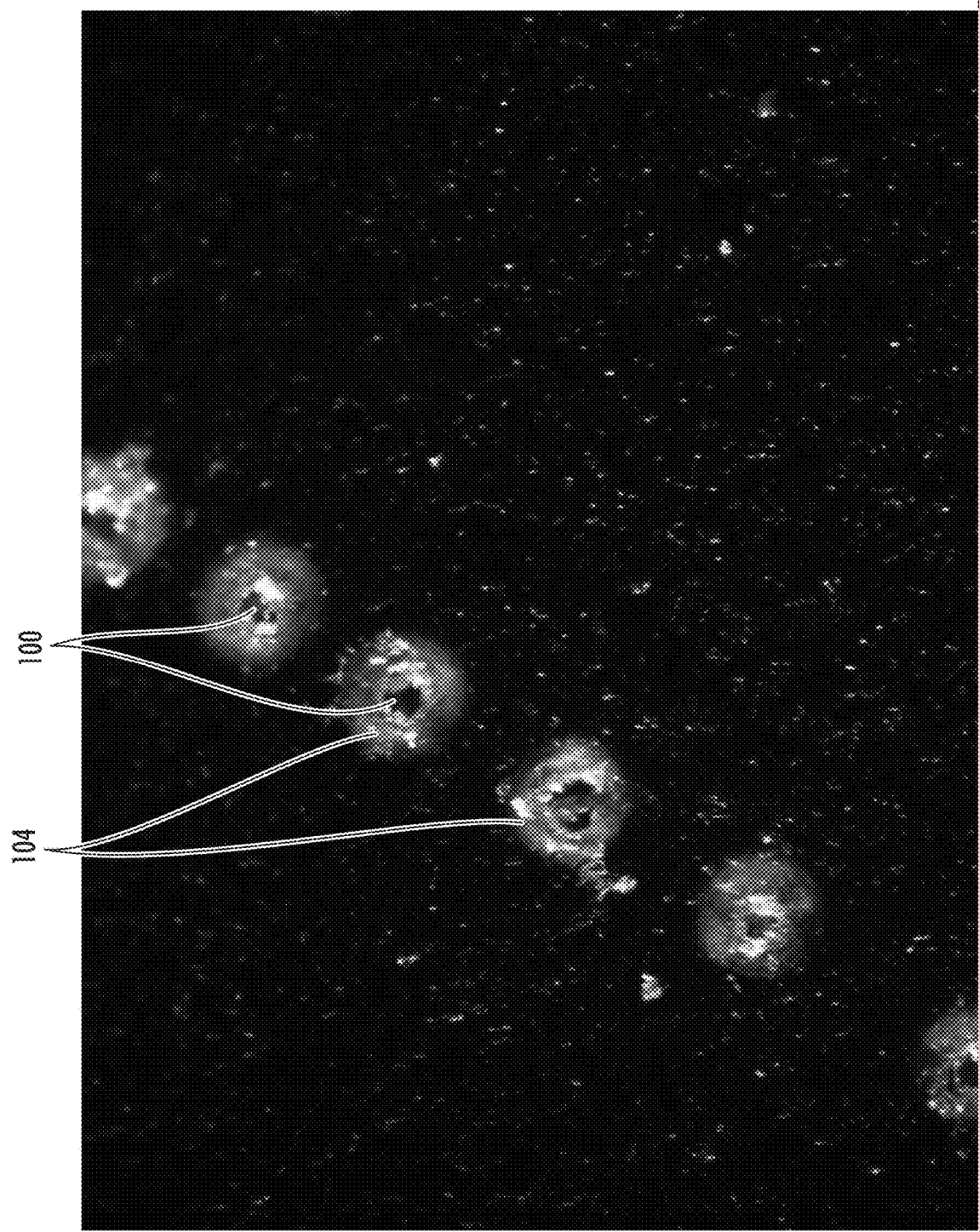
FIG. 11 is a detailed image of an optical fiber cable with laser-induced indicia, according to an exemplary embodiment.

FIG. 10 depicts a fiber optic ribbon 70 having a ribbon matrix 106. Ribbon 70 includes a plurality of optical fibers 24 supported by ribbon matrix 106. In this embodiment ribbon 70 includes twenty-four optical fibers 24, although in other embodiments ribbon 70 includes other numbers of optical fibers, such as four, eight, twelve, twenty-four, thirty-six, forty-eight, etc. optical fibers 24. Ribbon matrix 106 includes a primary ribbon matrix 108, which surrounds and directly contacts optical fibers 24. Outer surface 112 of primary ribbon matrix 108 interfaces with and is coupled to secondary ribbon matrix 110 having an outer secondary surface 90. In this embodiment, an interface 92 between primary ribbon matrix 108 and secondary ribbon matrix 110 is decoupled at delamination regions 96 via application of the laser energy onto ribbon matrix 106. In such embodiments, the delamination regions 96 are formed via laser in a pattern to form indicia 62. As shown in FIG. 11 in one exemplary embodiment, application of the laser marking energy causes delamination between primary ribbon matrix 108 and secondary ribbon matrix 110, and in the specific embodiment shown, the laser energy also produces aperture 100 and surrounding foamed region 104. In this specific embodiment, indicia 62 are formed by a series of delamination regions 96, apertures 100, and foamed regions 104 that are located around each aperture 100.

Figure 12:
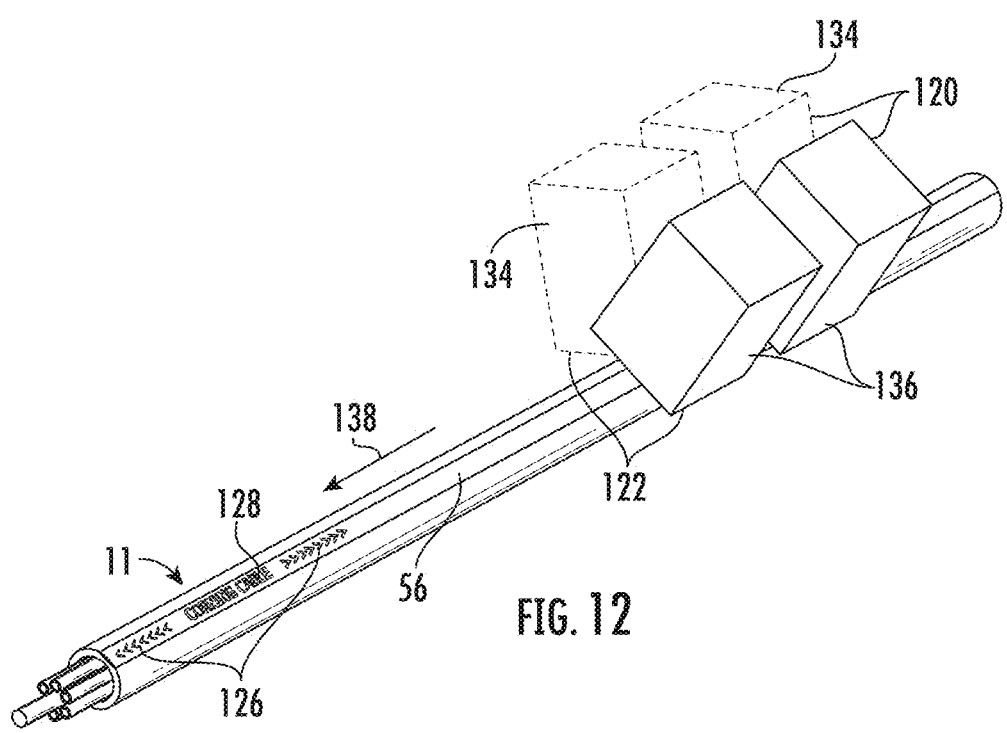
FIG. 12 depicts a partial schematic view of a processing line for manufacturing the optical fiber cable of FIG. 2 with laser-induced indicia, according to an exemplary embodiment.
Figure 13:
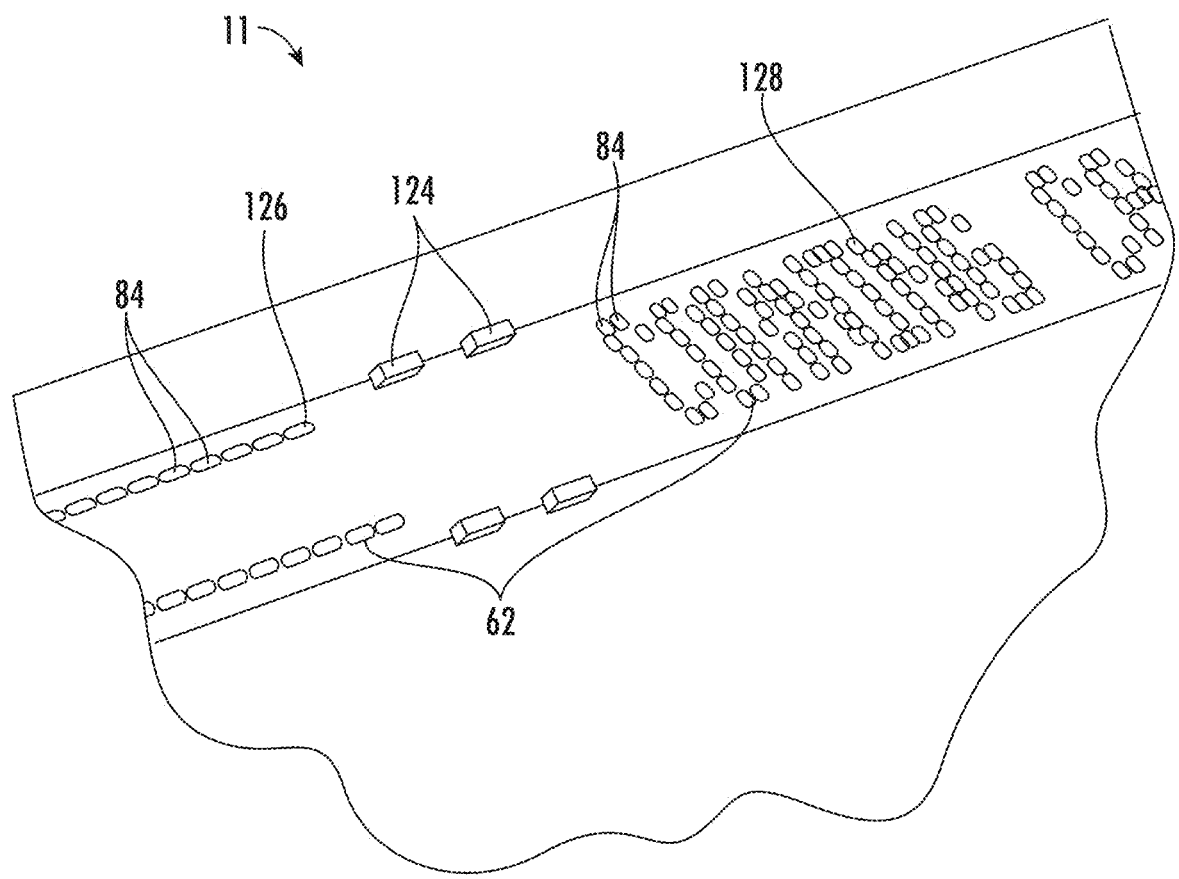
FIG. 13 depicts a detailed view of the optical fiber cable of FIG. 2, according to an exemplary embodiment.

Referring to FIGS. 12-13, various methods of creating indicia 62 in a cable jacket 12 are shown. Optical fiber cable 11 is moved in direction 138. Laser print head 120 and vision system 122 are originally at initial position 134. Laser print head 120 emits a laser towards cable jacket 12 to attempt to create a first indicia 62. Vision system 122 determines whether the first indicia formed by the laser is located within primary body portion 54 or one of the marking regions 56 or 58 based on the contrast created. Because of the differential material between primary body portion 54 and regions 56 and 58, a first indicia formed in region 54 has a low level of contrast relative to a first indicia formed in one of the marking regions 56 or 58. If a low contrast indicia is detected by the vision system 122, relative movement is created between laser print head 120/vision system 122 and cable jacket 12 are moved to adjusted position 136 This process is repeated until laser print head 120/vision system 122 are aligned with first marking region 56 or 58. Formation of indicia within regions 56 or 58 then proceed via application of laser energy and the inducement of one of the changes within the material of regions 56 as discussed above. During the printing process, vision system 122 periodically or continuously evaluates the positioning of printed indicia via a measurement of contrast, and readjusts the positioning of laser print head 120/vision system 122 if printing outside of region 56 is detected.

In a specific embodiment, laser print head 120 forms orientation-indicative markings 126 in cable jacket 12. In such embodiments, vision system 122 analyzes cable jacket 12 for orientation-indicative markings 126 (in this example shown as chevrons "<" and ">"). If laser print head 120 is orientated relative to cable jacket 12 such that it is emitting a laser in the center of first marking region 56, then the entire chevron has the high level of contrast indicative of location within marking region 56 or 58 and no adjustment of laser print head 120 and vision system 122 is made. Alternatively, if only a portion of first marking region 56 is beneath laser print head 120, then only a portion of the chevrons will have the high level of contrast indicative of location within marking region 56 or 58 (e.g., only the top-portion or the bottom portion of chevrons is visible). Vision system 122 detects the partial and/or reduced visibility of orientation-indicative markings and determines a direction that laser print head 120 and vision system 122 need to be adjusted. Because chevrons include two angled sides extending from a leading point in the vertical center of the chevron character, vision system 122 adjusts the position of laser print head 120 and vision system 122 until the leading point at the vertical center of the chevron is in the desired location of marking region 56 or 58 (e.g., the middle) by moving laser print head 120 and vision system 122 to adjusted position 136. Based on these adjustments, non orientation-indicative markings 128 (e.g., the characters "CORNING CABLE" in this example) are better aligned within the center of first marking region 56. Orientation-indicative markings 126 and non orientation-indicative markings 128 are both examples of indicia 62 formed in the cable jacket 12 for a specific purpose.

In one embodiment, multiple print heads 120 are used. A first print head 120 emits a laser towards cable jacket 12 and vision system 122 detects which indicia 62, if any, were formed in cable jacket 12. A second print head 120 that is further down the manufacturing line than the first print head 120 prints additional indicia 62, such as the characters that identify optical fiber cable 11 (e.g., the non orientation-indicative markings 128).

In another embodiment, multiple print heads 120 (e.g., 2 or more) are circumferentially placed around the cable. A circumferentially placed vision system 122 detects which of the multiple print heads 120 are in proper alignment (or require the least adjustment to a proper position) and the appropriate print head 120 receives a signal to print indicia 62.

In another embodiment, cable jacket 12 includes physical structures 124 that delimits and/or indicates the position of first marking region 56 on cable jacket 12. As shown in FIG. 13, physical structure 124 includes a series of protrusions and/or ridges, but it is contemplated herein that physical structure 124 includes recesses within cable jacket 12 and/or first marking region 56 in alternate embodiments.

Turning more specifically to FIG. 13, in another embodiment, cable jacket 12 includes dashed orientation markings 126 located at or near the edges of first marking region 56 and/or second marking region 58. Similar to how vision system 122 analyzes chevrons to orient laser print head 120 and vision system 122 with respect to optical fiber cable 11, vision system 122 analyzes the dashes to adjusts the position of laser print head 120 and vision system 122 until both the top and bottom dashes are positioned in marking regions 56 or 58 as desired (e.g., at the top and bottom of regions 56 or 58).

Referring to FIGS. 14 and 15, according to another method of generating indicia 62, preferential-bend cable 13 is passed through one or more arcs, shown as wheels 132. As noted in FIG. 4, marking regions 56 and 58 on preferential-bend cable 13 are located 90 degrees from the preferential bend access. By bending preferential-bend cable 13 over wheels 132, the preferential bend of cable 13 ensures that regions 56 or 58 face away from away from wheel 132 and toward laser print head 120.

Turning to FIG. 15, depending on the tendency of cable 13 to preferentially bend along its desired axis, which in part depends on the ease with which strength members 38 can be deflected, cable 13 is deflected a certain distance by wheels 132. In one embodiment deflection 82 of cable 13 is between 20-500 mm, and more specifically between 100-500 mm.

In one embodiment, cable 13 is passed through a multiple wheel 132 deflection system (e.g., a three wheel deflection system as shown) both before and after printing indicia 62. This arrangement maintains a biasing alignment on cable 13 throughout the printing process, thus reducing the likelihood that cable 13 will become misaligned while passing by the printer.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber carrying structure comprising:
a cable jacket comprising an inner surface and an outer surface, the inner surface defining a central bore extending in a longitudinal direction between first and second ends of the cable jacket, the cable jacket comprising:
a primary body portion formed from a first polymer material;
a first marking region formed from a second polymer material, the first marking region coupled to the primary body portion and extending along the primary body portion in the longitudinal direction, wherein the second polymer material is different than the first polymer material; and
a second marking region formed from the second polymer material, the second marking region coupled to the primary body portion and extending along the primary body portion in the longitudinal direction, wherein the second marking region is spaced along the primary body portion from the first marking region; and
indicia formed in at least one of the first marking region and the second marking region, the indicia formed from a laser-induced change to the second polymer material; and
an optical communication element located within the central bore and extending in the longitudinal direction between first and second ends of the cable jacket;
wherein the optical fiber carrying structure comprises a preferential-bend axis; and
wherein the first marking region and the second marking region are located on opposite sides of the preferential-bend axis.

2. The optical fiber carrying structure of claim 1, wherein the change to the second polymer material comprises a physical change.

3. The optical fiber carrying structure of claim 1, wherein the first polymer material comprises more than 2.5% carbon black by weight, and wherein the second polymer material comprises less than 2.5% carbon black by weight.

4. The optical fiber carrying structure of claim 1, wherein the laser-induced change comprises a change in an additive material in the second polymer material.

5. The optical fiber carrying structure of claim 1, wherein the jacket is an outer jacket, and wherein the outer surface of the jacket defines an outer-most surface of the optical fiber carrying structure.

6. The optical fiber carrying structure of claim 1, wherein the jacket is a ribbon body that surrounds and supports at least four optical communication elements.

7. The optical fiber carrying structure of claim 1, wherein the first marking region defines a circumferential arc length of between 30 and 120 degrees.

8. The optical fiber carrying structure of claim 1, further comprising an interface between the primary body portion and the first marking portion, wherein the indicia are formed at least partially within the first marking portion between the interface and the outer surface of the jacket in a radial direction.

9. The optical fiber carrying structure of claim 1, wherein the circumferential positioning of the first marking region with respect to the bend axis is constant along the length of the jacket.

10. An optical fiber carrying structure comprising:
a jacket comprising an inner surface and an outer surface, the inner surface defining an internal region extending in a longitudinal direction between first and second ends of the jacket, the jacket comprising:
an inner polymer layer;
an outer polymer layer coupled to the inner polymer layer along an interface; and
indicia formed from regions where the outer layer is separated from the inner layer along the interface; and
an optical communication element located in the internal region of the jacket;
wherein the optical fiber carrying structure comprises a preferential-bend axis defining a first side of the jacket and a second side of the jacket opposite to the first side; and
wherein the indicia are located on either the first side of the jacket or the second side of the jacket.

11. The optical fiber carrying structure of claim 10, wherein the indicia are formed radially interior to an outer-most surface of the outer layer.

12. The optical fiber carrying structure of claim 10, wherein the inner layer is more opaque than the outer layer.

13. The optical fiber carrying structure of claim 10, wherein the indicia comprises an aperture defined within the outer layer and formed by a laser.

14. The optical fiber carrying structure of claim 10, wherein the jacket is a ribbon matrix, wherein the inner polymer layer is a primary ribbon matrix and the outer polymer layer is a secondary ribbon matrix, wherein a plurality of optical communication elements are embedded in and surrounded by the primary ribbon matrix when viewed in longitudinal cross-section and the secondary ribbon matrix is bonded to an outer surface of the primary ribbon matrix.

15. The optical fiber carrying structure of claim 10, comprising further indicia formed from further regions where the outer layer is separated from the inner layer along the interface, wherein the further indicia are located on an opposite side the jacket from the indicia.

16. A method of manufacturing an optical fiber carrying structure, the method comprising:
    moving an optical fiber carrying structure to a laser print head, the optical fiber carrying structure comprising an optical communication element, a jacket that radially surrounds the optical communication element, and a preferential-bend axis defining a first side of the jacket and a second side of the jacket, the jacket comprising a marking region;
    passing the jacket past the laser print head;
    identifying a position of the marking region on either the first side of the jacket or the second side of the jacket;
    moving the laser print head relative to the jacket based on the identification of the position of the marking region to align the laser print head with the marking region; and
    emitting a laser light from the laser print head onto the marking region to form indicia.

17. The method of claim 16, wherein the laser print head only moves 180 degrees or less to align the laser with the marking region.

18. The method of claim 16, wherein the optical fiber carrying structure comprises a physical structure that indicates a position of the marking region.

19. The method of claim 18, wherein the physical structure comprises a plurality of protrusions that indicate the position of the marking region.

20. The method of claim 16, wherein the method further comprises:
    passing the optical fiber carrying structure around an arc to position the marking region as a result of bending relative to the preferential bend axis.

21. The method of claim 16, further comprising:
    identifying a further position of a further marking region on an opposite side of the jacket from the marking region;
    moving the laser print head relative to the jacket based on the identification of the further position of the further marking region to align the laser print head with the further marking region; and
    emitting a laser light from the laser print head onto the further marking region to form further indicia.

22. A method of manufacturing an optical fiber carrying structure, the method comprising:
    moving an optical fiber carrying structure to a laser print head, the optical fiber carrying structure comprising an optical communication element and a jacket that radially surrounds the optical communication element, the jacket comprising a marking region;
    passing the jacket past the laser print head;
    identifying a position of the marking region;
    moving the laser print head relative to the jacket based on the identification of the position of the marking region to align the laser print head with the marking region; and
    emitting a laser light from the laser print head onto the marking region to form indicia;
    wherein the indicia comprise a plurality of orientation-indicative markings and a plurality of non orientation-indicative markings, and wherein the plurality of orientation-indicative markings are formed by a second laser print head and the plurality of non orientation-indicative markings are formed by the laser print head.

* * * * *